Aug. 13, 1968 E. M. HARWELL 3,396,827

TACTILE KEYBOARD

Original Filed Sept. 19, 1962

INVENTOR.
EDWARD M. HARWELL

BY

N. Friedman

ATTORNEY

United States Patent Office 3,396,827
Patented Aug. 13, 1968

3,396,827
TACTILE KEYBOARD

Edward M. Harwell, Houston, Tex., assignor to Litton Business Systems, Inc., a corporation of New York
Continuation of application Ser. No. 224,641, Sept. 19, 1962. This application Apr. 25, 1966, Ser. No. 545,166
12 Claims. (Cl. 197—98)

This application is a continuation of application Ser. No. 224,641, filed Sept. 19, 1962.

The present invention pertains to keyboards. More particularly, it has to do with a novel and improved keyboard for touch operation. By touch operation is meant the type of operation in which the operator does not look at the keyboard in selecting the keys to be depressed, but relies merely upon the touch or tactile sense to determine that she will be operating the intended keys.

The prior art is replete with numerous approaches to structural modification of the keys of a keyboard to facilitate touch operation. These prior approaches have involved providing various types of surface deformations in the surface of the key whereby the operator will be able to readily distinguish various keys from another by touch. However, these previous attempts to provide tactile sensing means for touch operation have never been commercially successful for a variety of reasons. The major obstacle to their commercial success has been the fact that they have all involved essentially the application of a different type of surface deformation for each key of the keyboard. This has caused the cost of incorporating such keys in the keyboard to be prohibitive since, in essence, it was necessary to provide a different key or key cap for every key position. Further, aside from cost considerations, the multiplicity of the different types of tactile devices to which the operator had to become accustomed proved to be so confusing as to completely negate the intended saving of labor and time.

The present invention has been arrived at after long study and experimentation. The keyboard of the invention is provided with novel tactile identifying means of two different forms, both forms presenting a touch sensation only along a line. In any given column of the keyboard, these lines all extend in the same direction. However, in the immediately adjacent column, the tactile identifying means of the keys are arranged to present a touch sensation to the operator in a direction substantially different from the first mentioned direction. This enables the operator to readily distinguish one column from the immediately adjacent column by touch. Furthermore, in a column the arrangement is such that each key presents a substantially different touch sensation from the keys lying immediately adjacent thereto, whereby the operator can readily distinguish the keys within the column from one another.

In the preferred embodiment of the invention disclosed herein, the two types of tactile identifying means providing touch sensations along the line are, respectively, spaced protuberances in the form of raised dots, and a raised rib.

In light of the foregoing remarks, it will be seen that a major object of the invention involves provision of a novel keyboard adapted for improved touch operation.

A further object is the provision of such a keyboard which can be produced at relatively low cost.

The primary intended application of the invention is in cash registers. There exists a special need for a commercially acceptable touch keyboard for cash registers because of the amounts of money directly handled. This is especially true in supermarket operations where personnel turnover is high. The present invention significantly accelerates the training of new check-out clerks in cash register operation, and also materially assists trained personnel in maintaining accuracy in such operation.

Another object of the invention is the provision of such a keyboard in which the number of different types of tactile devices is kept to a minimum, whereby an operator can readily learn how to use such a keyboard, and can use the keyboard, without confusion.

The above and other objects, advantages, and features of the invention will become apparent to those skilled in the art from a reading of the following detailed description in conjunction with the accompanying drawing in which.

Figure 1:
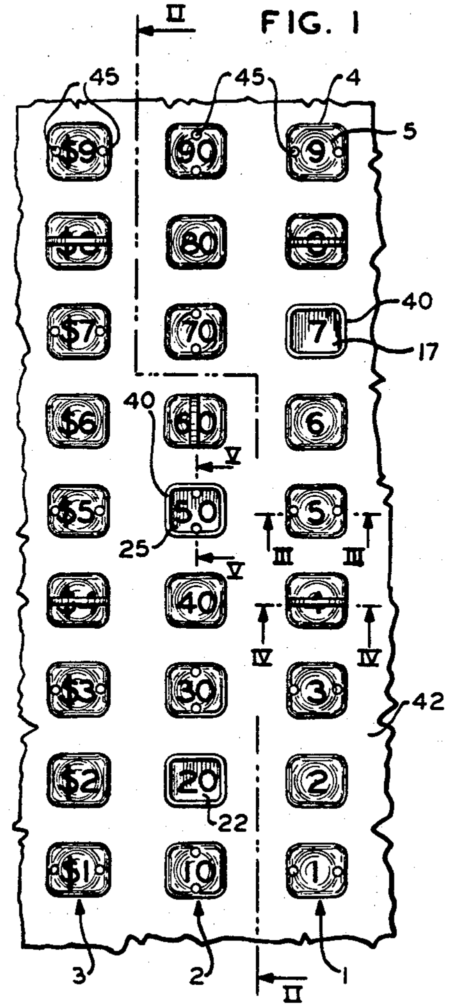
FIG. 1 is a front view of a cash register keyboard in which the present invention is incorporated.

Referring to FIG. 1 of the drawing, there is shown the digital key bank of a cash register keyboard in which the invention is embodied. The key bank includes three columns of keys, namely a "cents" or units column 1, a "dimes" or tens column 2, and a "dollars" or hundreds column 3. As is customary, each of the columns of keys comprises nine keys corresponding respectively to the digital values 1–9.

Three of the keys, namely the seventh key 17 of the units column and the second key 22 and the fifth key 25 of the tens columns, are employed as "home" keys. They are so identifiable to the touch by being provided with a continuous upstanding ridge or flange 40 about their outer edge. By "home" keys is meant that after each ring-up operation, the operator always returns her fingers to a position contacting at least some of these three keys preparatory to entering the price of the next item on the keyboard.

The top 4 of each key, with the exception of the above-mentioned home keys 17, 22, and 25, is provided with a concave recess 5 to conform to and receive the rounded tip of the operator's finger. Home keys 17, 22, and 25 are substantially flat within their peripheral flanges 40.

The keys include conventional key stems 41 guided for longitudinal movement in respective upper and lower keyboard plates 42, 43. Compression springs 44 serve to bias the keys to their normal, raised unoperated position.

In accordance with the invention, the keys of the above-described conventional keyboard are provided with the two forms of novel tactile indicia now to be described.

One of the two types of indicia comprises two small spaced approximately hemispherical protuberances 45 disposed at the opposite sides of the top surface of the key. It will be understood that the "top surface" of the key is that surface which is contacted by the operator's fingers for key operation. As seen in FIG. 1, certain ones of the keys in each of the columns are provided with this type of indicia, namely, in the units column 1, the first, third, fifth, and ninth keys; and in the tens and hundreds columns 2 and 3, the first, third, fifth, seventh, and ninth keys. As seen in FIG. 1 in the units and hundreds columns, each pair of protuberances 45 lies on a line (or defines a line) extending in a side to side direction. On the other hand, in the tens column 2, lying between the aforesaid two columns 1 and 3, each pair of spaced hemispherical protuberances 45 lies along a line extending in the fore and aft direction, or in other words in a directiion perpendicular to the disposition of the aforesaid horizontal lines of the protuberances of the units and hundreds columns.

The second type of tactile indicia employed in the preferred embodiment comprises a continuous raised rib 46 extending across the key between the opposite edges thereof. As best seen in FIG. 1, rib 46 is of uniform thickness. It is also of substantially uniform height, its upper edge being concavely curved to conform to the concave recesses 5 provided in the upper surface of the keys. As shown in FIG. 1, in the units and hundreds columns rib 46 is applied to the fourth and eighth keys, and extends in a side-to-side or horizontal direction parallel to the lines defined by each pair of the spaced hemispherical protuberances 45 applied to other keys in the same two columns.

In the tens column 2, the rib 46 is applied to the sixth key, and extends in the same fore and aft direction as the pairs of protuberances 45 applied to other keys of this column.

From the foregoing it will be seen that in any one column of the keyboard, the two types of indicia employed, i.e., the spaced protuberances 45 and the continuous rib 46, will each present a tactile sensation to the operator along lines which extend in the same general direction. Furthermore, this direction is significantly different as between adjacent columns, thereby enabling the operator to readily distinguish adjacent columns from one another by touch.

If the operator receives a touch sensation along a side to side line bisecting the key, she is thereby made aware that she is touching only a units or hundreds key, and not a tens key, since the latter keys present only a fore and aft touch sensation along the median lines of the keys. Parenthetically, it should be noted that because they are separated by the tens column, the units and the hundreds columns are not likely to be mistaken for one another.

Furthermore, within a given column even though the protuberances 45 and ribs 46 respectively present a touch sensation in the same (parallel) directions, the touch sensations they present are readily distinguishable from each other. The operator can readily feel the interrupted or discontinuous sensation afforded by the protuberances 45, and distinguish this from the uninterrupted, continuous sensation afforded by the ribs 46.

It has been found unnecessary to provide the novel tactile indicia of the invention for every key of the keyboard. The following keys are unprovided with the indicia: the second, sixth and seventh keys of the units column 1; the second, fourth, and eighth keys of the tens column 2; and the second and sixth keys of the hundreds column 3. Despite this, it will be seen from an inspection of FIG. 1 that each and every key will present a touch sensation significantly and distinguishably different from all the keys adjacent thereto. The fact that each of the abovementioned keys is not provided with any special tactile indicia in itself serves as a tactile means for differentiating said keys from the adjacent keys.

Additional means are provided to enable the operator to readily distinguish the dollars column 3 from the other two columns. The return springs **44*a*** for the keys of this column are substantially heavier in action than the return springs for the first two columns. Accordingly, the operator will have to employ a greater force to depress the dollar column keys, and will readily sense this by touch.

Figures 2, 3:
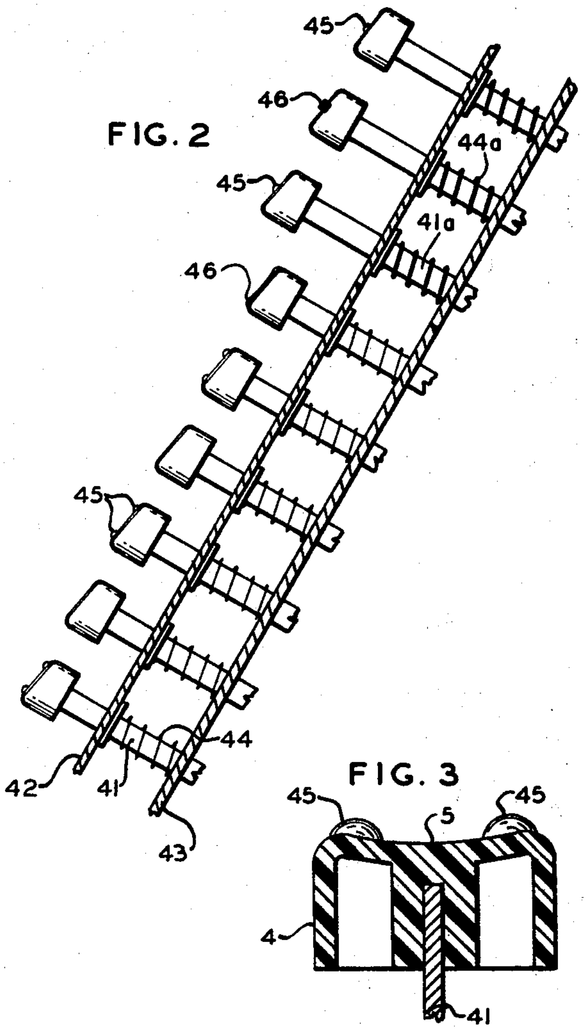
FIG. 2 is a sectional view taken on line II—II of FIG. 1.
FIG. 3 is an enlarged sectional view taken on line III—III of FIG. 1, showing the spaced, spherical-protuberance type of tactile indicia applied to a key.

Additionally, as seen in FIG. 2 the stems **41*a*** of the dollar column keys are all longer than the stems of the other keys to cause the former to stand at a higher elevation from the upper keyboard cover plate than the latter. This higher elevation of the tops of the dollar column keys further assists the operator in being able to distinguish these keys from the other two columns by touch.

Figure 4:
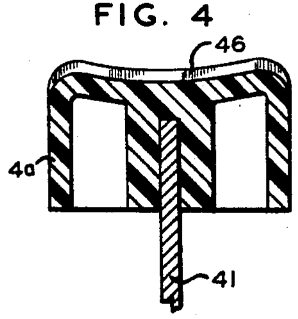
FIG. 4 is a similar view taken on line IV—IV of FIG. 1, showing the second type of tactile indicia comprising an elongated raised rib provided on a key.
Figure 5:
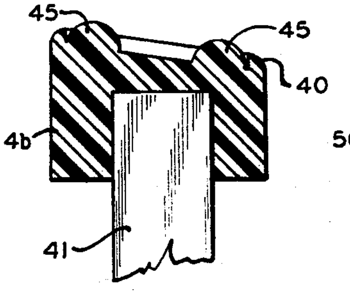
FIG. 5 is a similar view taken on line V—V of FIG. 1, showing the spherical-protuberance type of indicia applied to a key which has a continuous peripheral upstanding lip or flange.

The above-described novel tactile indicia of the invention may be incorporated in the keys in any suitable fashion. As shown in FIGS. 3–5, the indicia may be made integral with the key tops. Alternatively, the indicia can be provided in the form of separate elements rigidly secured to conventional key tops in any suitable fashion as by cementing, etc.

Figure 6:
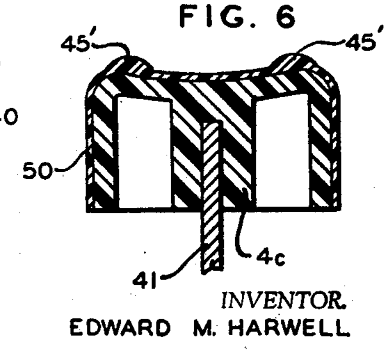
FIG. 6 is a view similar to FIG. 3, but showing a modified form of the invention wherein the tactile devices of the invention are provided on a transparent cap which can be slipped over a conventional key.

A particularly desirable arrangement for incorporating the novel tactile indicia of the invention in existing keyboards is shown in FIG. 6. This involves providing a relatively thin key cap 50 adapted to fit over the conventional key top **4*c*. The tactile indicia, i.e., the spaced hemispherical protuberances 45′ of FIG. 6 and the raised rib, are formed integral with cap 50. The latter has a substantially uniform wall thickness and is contoured to conform to the exterior surface shape of the conventional key to which it is to be applied. Thus, as shown in FIG. 6 the upper surface of the cap 50 is curved concavely to lie in intimate face-to-face contact with the surface of the conventional key top. The key cap 50** is preferably made of transparent material to allow the operator to see the key.

While there has been shown and described above two preferred forms of the invention, it will be appreciated that in practice numerous modifications, refinements, adaptations, etc., can be resorted to without departing from the spirit and scope of the invention. For example, an elongated groove can be provided in the key tops as a substitute for the raised ribs 46. The principles of the invention can be applied to more than three columns of a keyboard. It will be understood that the principles of the invention can be incorporated in numerous different types of keyboard operated devices, although as stated before the primary intended application is in cash registers. It is therefore intended that the foregoing disclosure be illustrative only and not limitative of the following claims.

I claim:

1. A keyboard: comprising a first pluraity of keys each having disposed thereon tactile identification indicia in the form of a pair of spaced surface deformations;

a second plurality of keys each having disposed thereon tactile identification indicia in the form of a continuous elongated surface deformation;

a plurality of home keys each having disposed thereon special tactile identification indicia;

a plurality of other keys;

said first plurality of keys, said second plurality of keys, said plurality of home keys, and said plurality of other keys all being disposed in an array including at least three side by side ordinally arranged columns of at least nine keys each, said nine keys in each of said columns being respectively representative of the digits "1" through "9," at least a majority of the keys in each of said columns having tactile identification indicia disposed thereon, with at least one of said home keys disposed in a first one of said columns and with all the other keys upon which there are disposed tactile identification indicia in said first one of said columns arranged with their tactile identification indicia disposed along first imaginary and parallel lines, with at least one of said home keys disposed in a second one of said columns and with all the other keys upon which there are disposed tactile identification indicia in said second one of said columns arranged with their tactile identification indicia disposed along second imaginary and parallel lines which are at an angle with respect to said first imaginary and parallel lines, and with all the keys upon which there are disposed tactile identification indicia in a third one of said columns arranged with their tactile identification indicia disposed thereon in a manner and along imaginary lines corresponding to that of said first one of said columns of keys;
said second column of keys being disposed between said first and said third columns of keys;
none of said keys in said side by side columns of keys being disposed adjacent another key in the same column having the same tactile identification indicia thereon;
none of said plurality of other keys being disposed adjacent any other of said plurality of other keys in any one of said side by side columns;
the disposition of said keys having tactile indicia and said home keys in said array being such that the operator of the keyboard may locate his fingers thereupon and with respect to particular digits by actile sensation.

2. The keyboard of claim 1, wherein
all the keys in said array representative of the digits 1, 3, 5, 7, and 9 constitute a first set, and all the keys in said array representative of the digits 2, 4, 6, and 8 constitute a second set;
the tactile indicia disposed on those keys of said first set upon which there are disposed tactile identification indicia all being of the same form; and
the tactile indicia disposed on those keys of said second set upon which there are disposed tactile identification indicia all being of the same form and different from the form of the tactile identification indicia disposed on said first set of keys.

3. The keyboard of claim 2, wherein
the form of the indicia on those keys of said first set upon which there are disposed tactile indicia being spaced surface deformations; and
the form of the indicia on those keys of said second set upon which there are disposed tactile indentification indicia being a continuous elongated surface deformation.

4. The keyboard of claim 1, wherein
said special tactile identification indicia disposed on said home keys is in the form of a continuous rib disposed about the periphery of the key;
said home key disposed in said first one of said columns occupying the position of the key representative of the digit 7; and
said second one of said columns including two home keys, one occupying the position of the key representative of the digit 2 and one occupying the key representative of the digit 5.

5. The keyboard of claim 1, wherein
at least some of the keys in each of said columns of keys are from said plurality of other keys.

6. The keyboard of claim 1, wherein:
said spaced surface deformations comprise two spaced protuberances; and
said elongated surface deformation comprises a raised rib.

7. The keyboard of claim 1, wherein:
said angle is ninety degrees.

8. The keyboard according to claim 1, wherein:
the keys of said first and said second columns are disposed at a first level, and the keys of said third column are disposed at a second level which is higher than said first level.

9. A keyboard: comprising
a first plurality of keys each having disposed thereon tactile identification indicia in the form of a pair of spaced surface deformations;
a second plurality of keys each having disposed thereon tactile identification indicia in the form of a continuous elongated surface deformation;
a plurality of home keys each having disposed thereon special tactile identification indicia;
a plurality of other keys;
said first plurality of keys, said second plurality of keys, said plurality of home keys and said plurality of other keys all being disposed in an array including at least three side by side ordinally arranged columns of nine keys each, the nine keys in each of said columns being respectively representative of the digits "1" through "9," at least a majority of the keys in each of at least two adjacent ones of said columns being from said first and second pluralities of keys, with at least one of said home keys disposed in a first one of said columns, with all the other keys from said first and second pluralities of keys that are disposed in said first one of said two columns being arranged with their tactile identification indicia extending in a first direction, and with all the other keys from said first and second pluralities of keys that are disposed in a second one of said columns being arranged with their tactile identification indicia disposed along imaginary and parallel lines which are at an angle with respect to said first direction;
none of said keys in said side by side columns of keys being disposed adjacent another key in the same column having the same tactile identification indicia thereon;
none of said plurality of other keys being disposed adjacent any other of said plurality of other keys in any one of said side by side columns;
the disposition of said keys having tactile indicia and said home keys in said array being such that the operator of the keyboard may locate his fingers thereupon and with respect to particular digits by tactile sensation.

10. The keyboard of claim 9, wherein:
said second column includes a pair of home keys.

11. The keyboard according to claim 9, wherein:
said angle is ninety degrees.

12. The keyboard according to claim 9, wherein:
the keys of the leftmost column of said three columns of keys are disposed at a level which is higher than the level of the keys of the other two columns.

References Cited

UNITED STATES PATENTS

| | | | |
|---|---|---|---|
| 662,834 | 11/1900 | Tcherkassov | 197—98 |
| 695,251 | 3/1902 | Vidal | 197—100 |
| 726,107 | 4/1903 | Stanton | 197—98 |
| 825,845 | 7/1906 | Landenbach | 197—98 |
| 1,148,721 | 8/1915 | Scott | 197—102 |
| 1,718,694 | 6/1929 | Kurowski | 197—102 |
| 1,823,130 | 9/1931 | Smith | 197—98 |
| 2,261,115 | 11/1941 | Hofgaard | 197—100 |
| 2,585,699 | 2/1952 | Streng | 197—98 |
| 2,628,030 | 2/1953 | Taylor | 35—5 |
| 2,351,541 | 6/1944 | Placke | 197—133 |
| 2,892,266 | 6/1959 | Tomkins | 35—5 |

ROBERT E. PULFREY, *Primary Examiner.*

E. T. WRIGHT, *Assistant Examiner.*